UNITED STATES PATENT OFFICE.

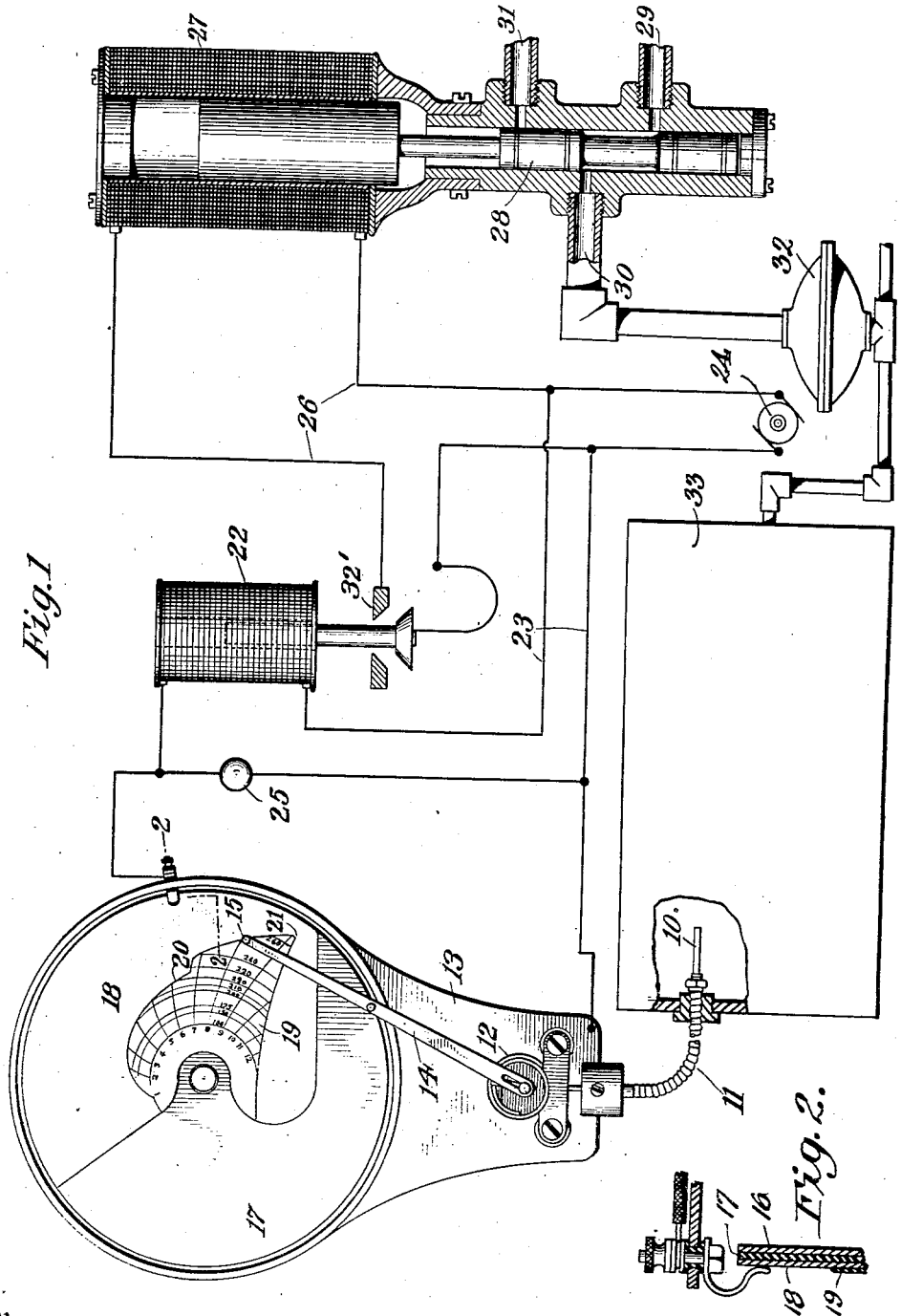

CHARLES J. STUART, OF SOMERVILLE, MASSACHUSETTS.

AUTOMATIC CONTROLLING DEVICE.

1,353,434.  Specification of Letters Patent.  Patented Sept. 21, 1920.

Application filed June 2, 1914. Serial No. 842,386.

*To all whom it may concern:*

Be it known that I, CHARLES J. STUART, a citizen of the United States, and a resident of Somerville, county of Middlesex, and State of Massachusetts, have invented certain new and useful Improvements in Automatic Controlling Devices, of which the following is a full, clear, and exact description.

This invention relates to governors and has for an object to provide apparatus for automatically controlling a fluid, gaseous, or other medium in which a varying temperature, pressure or other characteristic of the medium through a period is required.

I will describe a form of the invention especially adapted for controlling the temperature of the heat medium used in vulcanizing apparatus, reference being had to the accompanying drawing in which—

Figure 1 is a diagrammatic view of the apparatus;

Fig. 2 is an enlarged detail sectional view on the line 2—2, Fig. 1.

Briefly, I so construct the chart of a recording thermometer in connection with an electric circuit and suitable operating devices that a predetermined path of control indicated on the chart shall be faithfully followed automatically.

In the drawing is shown a recording thermometer of the usual and well known type in which the sensitive gas or liquid filled bulb 10 is connected by flexible tubing 11 to a helical or spiral form of pressure tube 12 which is fixed to the metal frame 13 of the recording instrument. The recording pen arm 14 is operated by the pressure tube, and causes the pen 15 to trace a record of temperature changes at the bulb on a chart carried by the revoluble clock face 16 of the recording instrument.

In carrying out my invention I provide a control chart consisting of a disk 17 of insulating material to which is affixed a plate 18 of conducting material substantially of the shape of the path to be followed by the recording pen but extending on all sides beyond it. The path to be followed is provided by affixing to the plate a sheet 19 of non-conducting material, the edge 20 of which determines the degree of temperature and the period, and for the sake of clearness, I have indicated the degrees of temperature on the chart by concentric division lines and the period by radial division lines. This chart is removably secured to the clock face in the usual manner and revolves as a unit with it.

The plate 18 of conducting material and the recording pen 15, which constitute make and break contacts, are put in circuit with controlling devices operating a valve for a source of heat, as will be presently described. Assuming the heat to be commenced and the pen started at the initial temperature which will be the point marked 1, as long as the pen travels on the non-conducting sheet, the heat is admitted to the vulcanizer or other heating chamber which it is desired to control, but as soon as the temperature rises too rapidly the pen arm carries the pen off the sheet of non-conducting material in a direction from the center toward the periphery and onto the plate of conducting material, thus establishing an electric circuit which operates the valve to shut off the heat medium. As soon as the temperature lowers, the pen arm carries the pen back onto the non-conducting material again at a point in advance of the point at which the pen left the material due to the travel of the chart by the clock devices of the recording instrument and breaks the circuit, thus leaving the valve uncontrolled so that the action of gravity or pressure causes a movement of the valve and permits the passing of the heat medium to the heating chamber.

In the drawing the edge 20 of the sheet of non-conducting material on the particular chart shown is curvilinear and corresponds to the record curve which ordinarily is traced by the recording pen in recording the degree and period of heat to which the articles, in this case rubber articles, are subjected. In practice the pen fluctuates along this edge so that the make and break operation goes on practically continuously, that is, the heat medium is shut off and applied, perhaps, every minute or two. In this way, the predetermined path of temperature and period is faithfully followed automatically. Besides following the path it naturally follows that at a predetermined point at which the heating operation shall stop, the heating medium is finally cut off and not re-established, this occurring at the point marked 21.

The operating devices used in connection with the present embodiment include a relay 22 in a circuit 23 with a source of electricity 24 and with the make and break contacts 15 and 18, a comparatively high resistance such as an incandescent lamp 25 shunted across the make and break contacts to prevent arcing, and an electromagnet valve device in a circuit 26 controlled by the relay. The valve device consists of a solenoid 27 operating a valve 28 which, as the current flows, allows air pressure, from some source, to enter at port 31 and flow through port 30 to a diaphragm valve 32 which cuts off the heating medium from the heating chamber 33 and as the current is broken, drops by gravity allowing air pressure on diaphragm valve to be exhausted through ports 30 and 29 which are appropriately arranged for this result. The air pressure being exhausted the diaphragm valve opens and allows the heating medium to flow to the heating chamber.

In operation, when the pen 15 is in contact with the plate of conducting material, the current flows from the source of electricity through the pen and through the plate 18 of conducting material and through the relay 22 which establishes the circuit through the terminals 32'. The current will then flow through the valve solenoid 27 which moves the valve to shut off the heating medium until the contact of the pen with the conducting material is broken, whereupon the relay will break the circuit at the terminals 32' and no current will flow around the solenoid 27 of the valve which then permits of the passage of the heating medium to the heating chamber.

While I have described and illustrated a temperature controlling apparatus which may be used in practising my invention, I do not limit myself to the control of temperature, as the invention in its broadest aspect, contemplates the automatic control of pressure, as well as other characteristics of any fluid, gaseous, or other medium in which a varying path of control through a period is required. I do not limit myself to the form of valve shown which opens fully at each actuation, equivalents such as gradually opening and closing valve, being possible, nor do I limit myself to the particular form of chart shown, or to the particular form of clock-operated instrument shown, it being only necessary to the practice of my invention that a path of control through a period be faithfully followed automatically.

The embodiment of the invention illustrated, of course, may be used to maintain a constant temperature at the bulb by simply stopping the clockwork mechanism so that any particular point on the edge 20 will be constantly intersected by the swinging pen 15, said point corresponding to the desired temperature in the heating chamber.

It will be understood that by the term "chart" or templet I contemplate any member having the characteristics of the member 18, regardless of the form thereof and the presence or absence of division lines or other indicia.

Having described my invention, what I claim and desire to have protected by Letters Patent is:

1. The combination with devices for effecting variations in a medium, of a control element having a predetermined contour corresponding to a desired sequence of variations in said medium, coacting means operating with said contour to produce said variations in accordance with said contour and means to remove said coacting means from said contour upon the occurrence of variations in said medium other than those in said desired sequence of variations.

2. The combination with devices for effecting variations in a medium, of a control element having a predetermined contour corresponding to a desired sequence of variations in said medium, coacting means caused to move by variations in said medium and operating with said contour to produce said variations in accordance with said contour and means to remove said coacting means from said contour upon the occurrence of variations in said medium other than those in said desired sequence of variations.

3. The combination with devices for effecting variations in a medium, of a control element having a predetermined contour corresponding to a desired sequence of variations in said medium, means for moving said contour progressively, coacting means operating with said contour to produce said variations in accordance with said contour, and means to remove said coacting means from said contour upon the occurrence of variations in said medium other than those in said desired sequence of variations.

4. The combination with devices for effecting variations in the physical conditions of a confined medium, of a control element having a contour corresponding to a predetermined varying sequence of degree and period which said variations are desired to follow, coacting means connected to said control element operating with said contour to automatically control said devices to effect a sequence of said variations in accordance with said contour, and means to remove said coacting means from said contour upon the occurrence of variations in said medium other than those in said desired sequence of variations.

5. The combinations with devices for producing variations in the conditions of a medium, of means for operating the devices, and an automatic controlling device for said means comprising an element having a predetermined outline corresponding to a desired sequence of variations in said medium, a second element whose position on the outline of said first element determines the conditions of said medium through the control of said means, and means to remove said second element from said first element upon the occurrence of variations in said medium other than those in said desired sequence of variations.

6. The combination with devices for effecting variations in a medium, of an electric circuit, a control element having a predetermined contour corresponding to a desired sequence of variations in said medium, a member whose position on said element laterally of said contour effects a make or break of said circuit, means for moving said contour and said member relatively, and electrical means operated by make and break of said circuit and controlling said devices to produce said variations in accordance with said contour.

7. A governor embodying an electric circuit, controlling devices operated by make and break of the circuit, an electrical conducting member in said circuit, an electrical non-conducting member, one of the said members having a predetermined contour adjacent to the other of said members, means for actuating the member having said contour, a sensitive member, and an electrical conducting member in said circuit moved by the sensitive member alternately upon the non-conducting member and the first named conducting member across said contour to make and break the circuit.

8. A governor embodying an electric circuit, controlling devices operated by make and break of the circuit, an electrical conducting member in said circuit, an electrical non-conducting member, one of the said members having a predetermined contour adjacent to the other of said members, means for rotating the member having said contour, a sensitive member, and an electrical conducting member in said circuit moved by the sensitive member alternately upon the non-conducting member and the first named conducting member across said contour to make and break the circuit.

9. A governor embodying an electric circuit, controlling devices operated by make and break of the circuit, an electrical conducting member in said circuit, an electrical non-conducting member, one of the said members having a predetermined contour adjacent to the other of said members, time-controlled means for rotating the member having said contour, a sensitive member, and an electrical conducting member in said circuit moved by the sensitive member alternately upon the non-conducting member and the first named conducting member across said contour to make and break the circuit.

10. A governor embodying an electric circuit, controlling devices operated by make and break of the circuit, an electrical conducting member in said circuit, a sensitive member, an electrical conducting member in said circuit moved by the sensitive member onto the first named conducting member to make the circuit, and a time-controlled electrical non-conducting member of a predetermined contour moved at times to intercept and disengage the second named conducting member to break the circuit from the first named conducting member.

11. A governor embodying an electric circuit, controlling devices operated by make and break of the circuit, an electrical conducting member in said circuit, an electrical non-conducting member affixed to the conducting member and having an advance edge of predetermined outline, time-controlled means for rotating said members as a unit, a sensitive member, and an electrical conducting member in said circuit moved by the sensitive member alternately upon the non-conducting member and first named conducting member across said edge to make and break the circuit.

12. A governor embodying an electric circuit, controlling devices operated by make and break of the circuit, a clock-operated chart, an electrical conducting member and an electrical non-conducting member on the chart, one of said members having a predetermined contour contiguous to the other of said members, a sensitive member, and a pivoted recording member of electrical conducting material in said circuit with the first named conducting member and moved by the sensitive member alternately upon the non-conducting member and conducting member across said contour to make and break the circuit.

13. A governor embodying an electrical conducting member, an electrical non-conducting member, one of said members having a predetermined contour contiguous to the other of said members, time-controlled means for rotating the member having said contour, a pivoted electrical conducting member, an electric circuit, the terminals of which are respectively connected to said conducting members, a sensitive member moving said pivoted member alternately upon the first named conducting member and the non-conducting member across said contour to make and break the circuit, and controlling devices operated by the make and break of the circuit.

14. A governor comprising an electric circuit, a control element having a contour corresponding to a degree period curve, a member whose position on said element laterally of said contour effects a make or break of said circuit, means for moving said contour and said member relatively, and an electromagnet device operated by make and break of said circuit to control the flow of a medium.

15. A governor comprising an electric circuit, a control element having a contour corresponding to a degree period curve, means for moving said contour progressively, means moved by variations in any medium which it is desired to control and whose position on said element laterally of said contour effects a make or break of said circuit, and an electro-magnet device operated by make and break of said circuit to control the flow of a medium.

16. A governor comprising an electric circuit, a control element having a contour corresponding to a degree period curve, a member swingable in an arc across said contour by variations in any medium which it is desired to control and whose position on said element laterally of said contour effects a make or break of said circuit, said control element being adapted to be held stationary to dispose any desired point on said curve to be constantly intersected by said swingable member, and an electro-magnet device operated by make and break of said circuit to control the flow of a medium.

17. In an apparatus of the kind described an electrical device for effecting variations in a medium, a source of current, a chart having a contour thereon corresponding to a desired sequence of variations in said medium, and means operating along said contour adapted to establish or disestablish electric connection between said source of current and said device to produce said sequence of variations in accordance with said contour.

18. In an apparatus of the kind described an electrical device for effecting variations in a medium, a source of current adapted to be placed in circuit therewith, a chart having a contour thereon formed by the junction of a conducting and a non-conducting element, said contour corresponding to a sequence of variations in said medium, and a tracer finger in said circuit operating along said contour on either side thereof and adapted to make or break said circuit to produce said sequence of variations in accordance with said contour.

19. In an apparatus of the kind described an electrical device for effecting variations in a medium, a source of current adapted to be placed in circuit therewith, a disk-shaped chart having a contour thereon formed by the junction of a conducting and a non-conducting element, said contour corresponding to a sequence of variations in said medium, a clock mechanism for rotating said chart, and a tracer finger in said circuit operating along said contour on either side thereof and adapted to make or break said circuit to produce said sequence of variations in accordance with said contour.

20. The combination with a device to be regulated, a measuring instrument operatively connected to the device and means for regulating the device, of a templet having a predetermined contour for coöperating directly with the measuring instrument to so control the means for regulating the device to be regulated that it is regulated in accordance with predetermined conditions.

Signed at Boston, county of Suffolk, State of Massachusetts, this 27th day of May, 1914.

CHARLES J. STUART.

Witnesses:
    CARRIE L. C. KEEFE,
    AGNES G. HANNEY.